United States Patent Office 3,488,716
Patented Jan. 6, 1970

---

3,488,716
PROCESS FOR THE REMOVAL OF NAPHTHENIC ACIDS FROM PETROLEUM DISTILLATE FRACTIONS
Jackson Eng, Sarnia Township, Lambton County, Ontario, Canada, assignor to Esso Research and Engineering Company, a corporation of Delaware
No Drawing. Filed Oct. 3, 1967, Ser. No. 672,436
Int. Cl. C10g 29/06
U.S. Cl. 208—263                            5 Claims

ABSTRACT OF THE DISCLOSURE

The disclosure relates to a catalytic process for the removal of naphthenic acids from petroleum distillate fractions that consists of contacting said fraction with a solid catalyst salt of a Group VIII metal or combination of metal salts, for example, consisting essentially of a metal salt of cobalt molybdate on alumina wherein said solid catalyst comprises a catalyst bed.

---

Some crude oils such as Tia Juana Medium, Colombian De Mares, San Jaoquin Valley and Baku contain napthenic acids. Distillates produced from these crudes must be treated to remove these acids. Otherwise, the acids will corrode the storage tanks, the piping, and the equipment in which the distillate products are used.

The conventional process for removing naphthenic acids from distillates is caustic treating. The treatment has a number of disadvantages. For example, sodium naphthenates produced in caustic treating form oil-caustic emulsions which interfere with the treatment and gels are formed which result in oil loss. Small quantities of sodium naphthenates in the oil product cause haze and emulsification. Furthermore, the used caustic solution presents a disposal problem.

The prior art also discloses that naphthenic acids can be removed from distillates by catalytic hydrotreating. However, the expense of supplying and circulating hydrogen limits the use of this technique.

The object of this invention is to provide a means of removing naphthenic acids from distillate fractions which is characterized by simplicity and low cost.

Briefly summarizing, the process of the invention comprises contacting petroleum distillate fractions containing naphthenic acid with a bed of catalyst at mild conditions and recovering a fraction having a significantly reduced acid content. Additional advantages and details of the invention will be apparent from the following description and examples which disclose certain non-limiting embodiments.

The process of the invention is applied to petroleum distillate fractions boiling in the range of 200–1000° F., preferably 300–700° F. The fractions contain from 0.001 to 5.0 wt. percent naphthenic acids. Exemplary naphthenic acid-containing fractions include diesel fuel, domestic heating oil, industrial heating oils, and mixtures thereof. Certain lube oil fractions also contain naphthenic acids and they are also suitable feeds for the process. The fractions are obtained by atmospheric or vacuum distillation or by any other appropriate separation means from acid-containing crude oils like those mentioned previously.

A conventional reactor adapted for liquid phase, mixed phase, or vapor phase contacting can be used. Ordinarily liquid phase contacting will be employed and the feed is passed downwardly through the catalyst bed.

Suitable catalysts include oxides and sulfides of nickel, tungsten, molybdenum, cobalt and iron and combinations thereof distended upon a suitable support material such as alumina, silica-alumina, bauxite, magnesia, and zirconia. The most preferred catalyst is cobalt molybdate on alumina.

The treating conditions are relatively mild. The temperature ranges from 200–1000° F., preferably 400–800° F. and pressures in the range of from 1 to 1000 p.s.i.g. are suitable. Feed rates can vary depending on the nature of the feed and the other conditions, but rates of 0.5 to 5 v./v./hr. are generally used.

The following examples illustrate the invention.

Two liquid phase runs were made on Tia Juana Medium Gas Oil boiling in the range of 380–600° F. This distillate has an acid number of 0.49 (about 0.22 wt. percent acid). For Run B the gas oil was spiked with naphthenic acid to increase its acid number about tenfold. Treating conditions in the downflow laboratory reactor included a temperature of 650° F., a pressure of 200 p.s.i.g., and a space velocity (LHSV) of 4 v./v./hr. The catalyst was cobalt molybdate on alumina (Nalcomo 471, Nalco, Chicago, Ill.).

TABLE I

| Run Feed | A Tia Juana Med. Gas Oil | | B Tia Juana Med. Gas Oil [2] plus Naph. Acids | |
|---|---|---|---|---|
| | Feed | Product | Feed | Product |
| API gravity | 36.4 | 36.8 | 36.4 | |
| Acid No. [1] | 0.49 | 0.03 | 5.38 | 0.39 |
| Sulfur, wt. percent | 0.48 | 0.26 | 0.48 | 0.43 |
| ASTM color | 0.5 | 1.0 | | |
| ASTM dist., °F.: | | | | |
| IBP | 385 | 380 | | |
| 5% | 412 | 410 | | |
| 10 | 426 | 425 | | |
| 50 | 490 | 485 | | |
| 90 | 565 | 565 | | |
| 95 | 582 | 579 | | |
| FBP | 600 | 600 | | |

[1] Mg KOH required to neutralize naphthenic acids in 1 gm. of oil (1 acid number approximately equivalent to 0.45 wt. percent naphthenic acids).
[2] Sufficient naphthenic acids added to bring Tia Juana Medium gas oil up to 5 acid number.

Comparing the feed and product of Run A it is seen that the treat reduced the acid number from 0.49 to 0.03. Run B shows that the process is very effective on higher acid number feeds. In both examples the acid number reduction was about 94%.

Without wishing to be bound thereby it is felt that the mechanism of the reaction is as follows:

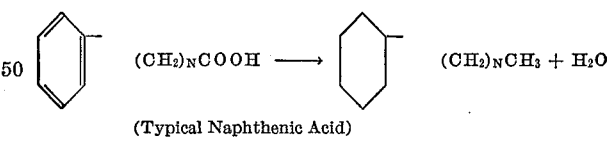

(Typical Naphthenic Acid)

Thus the reaction products are a hydrocarbon and water. This is significant because there is no oil loss as there is in caustic treating.

The process of the invention represents an effective, low cost process for eliminating 70–100% of the naphthenic acids from distillates without the penalties of yield loss, emulsion formation, and disposal problems connected with caustic treating. The process has obvious advantages over catalytic hydrotreating.

What is claimed is:

1. A process for removing naphthenic acids from a petroleum fraction comprising the steps of contacting said fraction with a treating agent consisting essentially of a catalyst comprising a salt of a metal selected from the group consisting of nickel, tungsten, molybdenum, cobalt, iron and combinations thereof distended on a suitable support material and recovering a petroleum fraction of reduced naphthenic acid content.

2. Process according to claim 1 in which the fraction is a gas oil containing 0.001–5.0 wt. percent naphthenic acid.

3. Process according to claim 1 in which said contacting is in the liquid phase.

4. Process according to claim 1 in which the catalyst is cobalt molybdate on alumina.

5. A process for removing acids from a petroleum fraction boiling in the range of 300–700° F. containing 0.001–5.0 wt. percent of said acids consisting essentially of the steps of passing said fraction over a treating agent consisting essentially of a bed of a catalyst comprising cobalt molybdate on alumina in the liquid phase, at a temperature in the range of 400–800° F. and a pressure in the range of 1–1000 p.s.i.g. and recovering a petroleum fraction of reduced naphthenic acid content.

References Cited

UNITED STATES PATENTS

| | | | |
|---|---|---|---|
| 2,734,019 | 2/1956 | Miller et al. | 196—24 |
| 3,340,184 | 9/1967 | Eng et al. | 208—238 |

DELBERT E. GANTZ, Primary Examiner

S. M. NELSON, Assistant Examiner